US011057385B2

(12) United States Patent
Awate et al.

(10) Patent No.: US 11,057,385 B2
(45) Date of Patent: Jul. 6, 2021

(54) METHODS TO RESTRICT NETWORK FILE ACCESS IN GUEST VIRTUAL MACHINES USING IN-GUEST AGENTS

(71) Applicant: NICIRA, INC., Palo Alto, CA (US)

(72) Inventors: Nilesh Awate, Pune (IN); Rayanagouda Bheemanagouda Patil, Pune (IN); Vasantha Kumar, Pune (IN); Amit Vasant Patil, Pune (IN)

(73) Assignee: Nicira, Inc., Palo Alto, CA (US)

( * ) Notice: Subject to any disclaimer, the term of this patent is extended or adjusted under 35 U.S.C. 154(b) by 217 days.

(21) Appl. No.: 16/033,243

(22) Filed: Jul. 12, 2018

(65) Prior Publication Data

US 2019/0364047 A1 Nov. 28, 2019

(30) Foreign Application Priority Data

May 24, 2018 (IN) .............................. 201841019456

(51) Int. Cl.
*H04L 9/30* (2006.01)
*H04L 29/06* (2006.01)
*G06F 9/455* (2018.01)

(52) U.S. Cl.
CPC ........ *H04L 63/101* (2013.01); *G06F 9/45558* (2013.01); *H04L 63/0236* (2013.01); *H04L 63/20* (2013.01); *G06F 2009/45587* (2013.01)

(58) Field of Classification Search
CPC ........ H04L 63/101; H04L 63/20; G06F 9/455
See application file for complete search history.

(56) References Cited

U.S. PATENT DOCUMENTS

| | | | | |
|---|---|---|---|---|
| 7,669,238 B2* | 2/2010 | Fee | .......................... | G06F 21/53 726/22 |
| 8,010,679 B2* | 8/2011 | Low | .................... | H04L 63/0227 709/227 |
| 8,677,358 B2* | 3/2014 | Evans | ..................... | H04W 4/60 718/1 |
| 8,812,876 B1* | 8/2014 | Ginzton | .............. | G06F 12/1408 713/193 |
| 2009/0276774 A1* | 11/2009 | Kinoshita | ........... | G06F 21/6218 718/1 |

(Continued)

*Primary Examiner* — Wasika Nipa
(74) *Attorney, Agent, or Firm* — Patterson + Sheridan, LLP

(57) ABSTRACT

Certain embodiments described herein are generally directed to systems and methods for preventing access to files on a virtual machine. One example method involves receiving network information associated with a network connection opened at the virtual machine and determining a process that opened the network connection. The method further involves receiving information indicative of a file access event attempted at the virtual machine and determining the process that opened the network connection initiated the file access event. The method further involves transmitting information indicative of the file access event and the network connection to a security virtual machine and receiving an enforcement decision for the file access event from the security virtual machine based on the information indicative of the file access event and the network connection. The method further involves applying the enforcement decision to either allow or prevent the file access event by the process.

22 Claims, 5 Drawing Sheets

(56) References Cited

U.S. PATENT DOCUMENTS

| | | | | |
|---|---|---|---|---|
| 2012/0216273 A1* | 8/2012 | Rolette | .................. | G06F 21/577 |
| | | | | 726/13 |
| 2013/0091534 A1* | 4/2013 | Gilde | .................. | H04L 63/0227 |
| | | | | 726/1 |
| 2014/0115578 A1* | 4/2014 | Cooper | ............... | H04L 63/1416 |
| | | | | 718/1 |
| 2017/0249453 A1* | 8/2017 | Voigt | .................. | G06F 21/6218 |

\* cited by examiner

METHODS TO RESTRICT NETWORK FILE ACCESS IN GUEST VIRTUAL MACHINES USING IN-GUEST AGENTS

RELATED APPLICATIONS

Benefit is claimed under 35 U.S.C. 119(a)-(d) to Foreign Application Serial No. 201841019456 filed in India entitled "METHODS TO RESTRICT NETWORK FILE ACCESS IN GUEST VIRTUAL MACHINES USING IN-GUEST AGENTS", on May 24, 2018, by Nicira, Inc., which is herein incorporated in its entirety by reference for all purposes.

BACKGROUND

Software defined networking (SDN) comprises a plurality of hosts in communication over a physical network infrastructure, each host having one or more virtual computing instances such as virtual machines (VMs) or containers that are connected to logical overlay networks that may span multiple hosts and are decoupled from the underlying physical network infrastructure. For example a logical overlay network, also referred to as a "logical network" or "software defined network (SDN)," may include logical networking elements. Logical network elements such as logical switches and logical routers are decoupled from the underlying physical network infrastructure by way of network tunneling between hosts. Thus, any arbitrary set of VMs in a datacenter may be placed in communication across a logical Layer 2 network by connecting them to a logical switch. The logical switch is collectively implemented by virtual switches on each host that has a VM connected to the logical network. The virtual switch on each host operates as a managed edge switch implemented in software by the hypervisor on each host. Forwarding tables at the virtual switches instruct the host to encapsulate packets, using a tunnel endpoint (TEP) from a participating VM to another VM on the logical network but on a different (destination) host with an outer IP header addressed to the destination host using a mapping of VM IP addresses to host IP addresses. At the destination host, a second tunnel endpoint decapsulates the packet and then directs the packet to the destination VM. Logical routers extend the logical network across subnets or other network boundaries using IP routing in the logical domain.

One advantage of SDN is that it offers security features superior to those provided in conventional networks. For example, important or sensitive information may be stored and used on particular VMs, which are more closely controlled and monitored by the central controller or by the hypervisor responsible for a particular VM. For example, a security policy may include a rule that a particular process running on a VM is allowed to establish certain kinds of network connections but not others.

As a further security measure, such security policies may be enforced outside of the VM itself, such as by a central controller or another secure VM not accessible by a user of the VM itself referred to as a security VM. In particular, implementing the security policy within the VM may be an inadequate solution. While the VM has access to the connection information needed to make an appropriate decision with respect to the network connection, enforcement from within the VM presents other issues. For example, such enforcement may rely on the security policy residing on the VM, which opens the security policy to modification by a user of the VM. As a result, the user (or, in another scenario, a malicious process) can alter the security policy to allow connections which should be prevented.

However, solutions for restricting network connections to and from VMs that are enforced outside of the VM itself do not provide the granularity of security policy desired for certain specific applications. As a result, systems and methods are needed to provide more granular security policy enforcement mechanisms.

DETAILED DESCRIPTION

Figure 1:
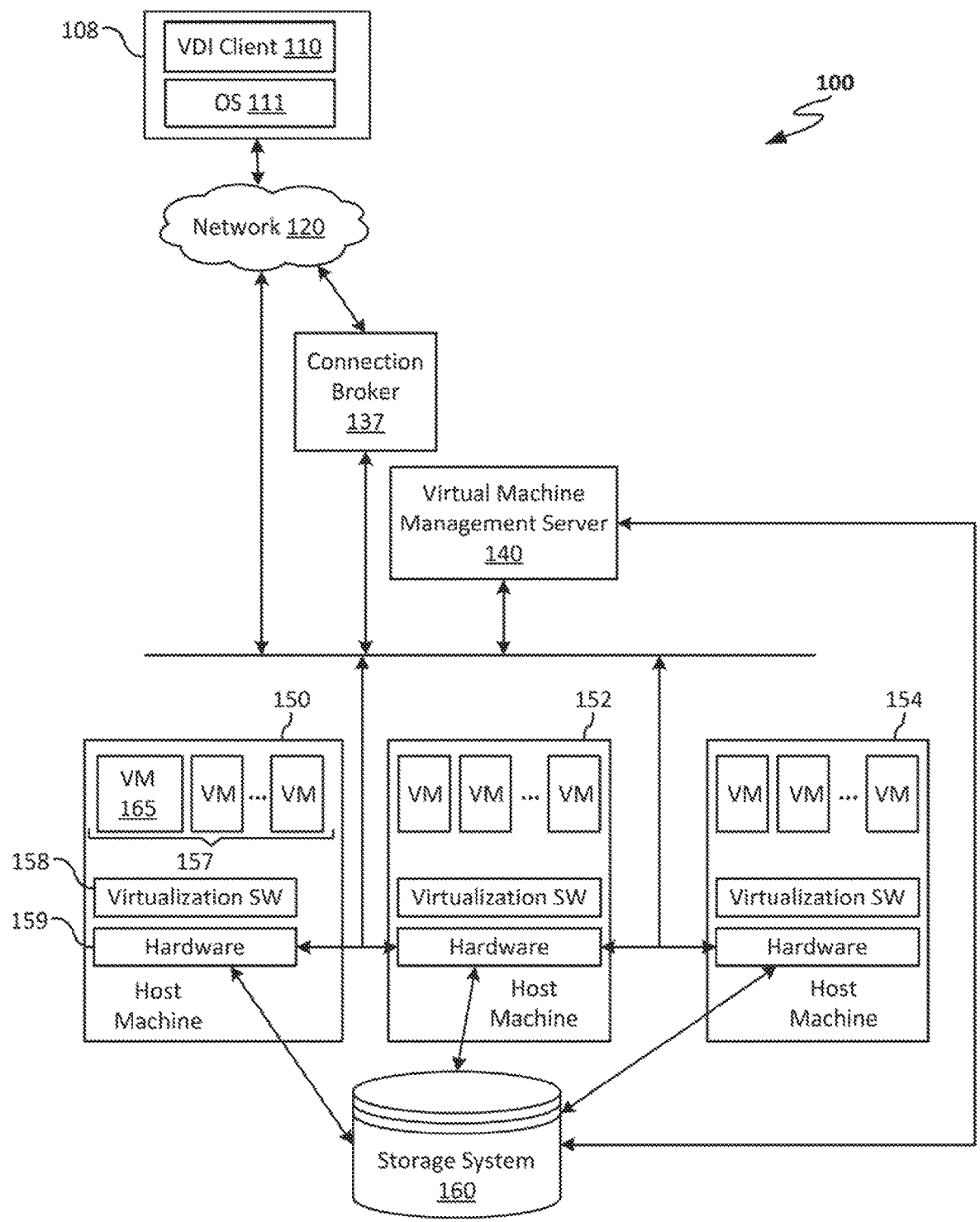
FIG. 1 illustrates components of a virtualized desktop infrastructure (VDI) system in which one or more embodiments may be implemented.

FIG. 1 illustrates components of a virtualized desktop infrastructure (VDI) system 100 in which one or more embodiments may be implemented. In VDI system 100, VDI client software programs (also referred to as "VDI clients" for short), e.g., VDI client 110, run on operating systems of local computing devices, e.g., client machine 108 on top of an operating system (OS) 111. Client machine 108 may be a smart phone, a tablet computer, a notebook computer, or any other type of computing device having conventional components such as one or more central processing units, memory, local storage, network interface cards, input devices such as a keyboard, mouse, touch screen, and microphone, and output devices such as a display and speakers. For simplicity, only one client machine 108 is shown in FIG. 1, but it should be understood that VDI system 100 supports different types of client machines 108 and in large numbers. VDI clients provide an interface for the users to access their desktops or certain applications, which may be running in one of virtual machines 157 or blade server (not shown) in a data center that is remote from the user locations. With VDI clients, users can access desktops or applications running in a remote data center through network 120, from any location, using a general purpose computer running a commodity operating system and a VDI client software program.

In the embodiments illustrated herein, desktops and applications are running in virtual machines 157 and virtual machines 157 are instantiated on a plurality of host machines 150, 152, 154, each of which includes virtualization software 158 and hardware 159, is controlled by a virtual machine management server 140, and is coupled to a shared persistent storage system 160. As used herein, a "connection broker" is any apparatus that is configured to manage connections to remote user sessions such as remote desktops, and a "domain controller" is any apparatus that is configured to have access to and manage user log-in information.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

A user of client machine 108 uses VMs in VDI system 100 to perform various computing tasks. For example, VM 165 may be used to perform web browsing. In order to allow for web browsing to be performed, partial access to the file system of VM 165 is granted to the user of client machine 108. However, unlimited access to such file systems may compromise the security of VM 165. In particular, sensitive files can be uploaded from VM 165, or dangerous files can be downloaded to VM 165 if full access to the file system is allowed. A thin agent allows fine-grain access to certain parts of the file system of VM 165. That is, a thin agent allows access to certain aspects of the file system while preventing access to others.

Figure 2:
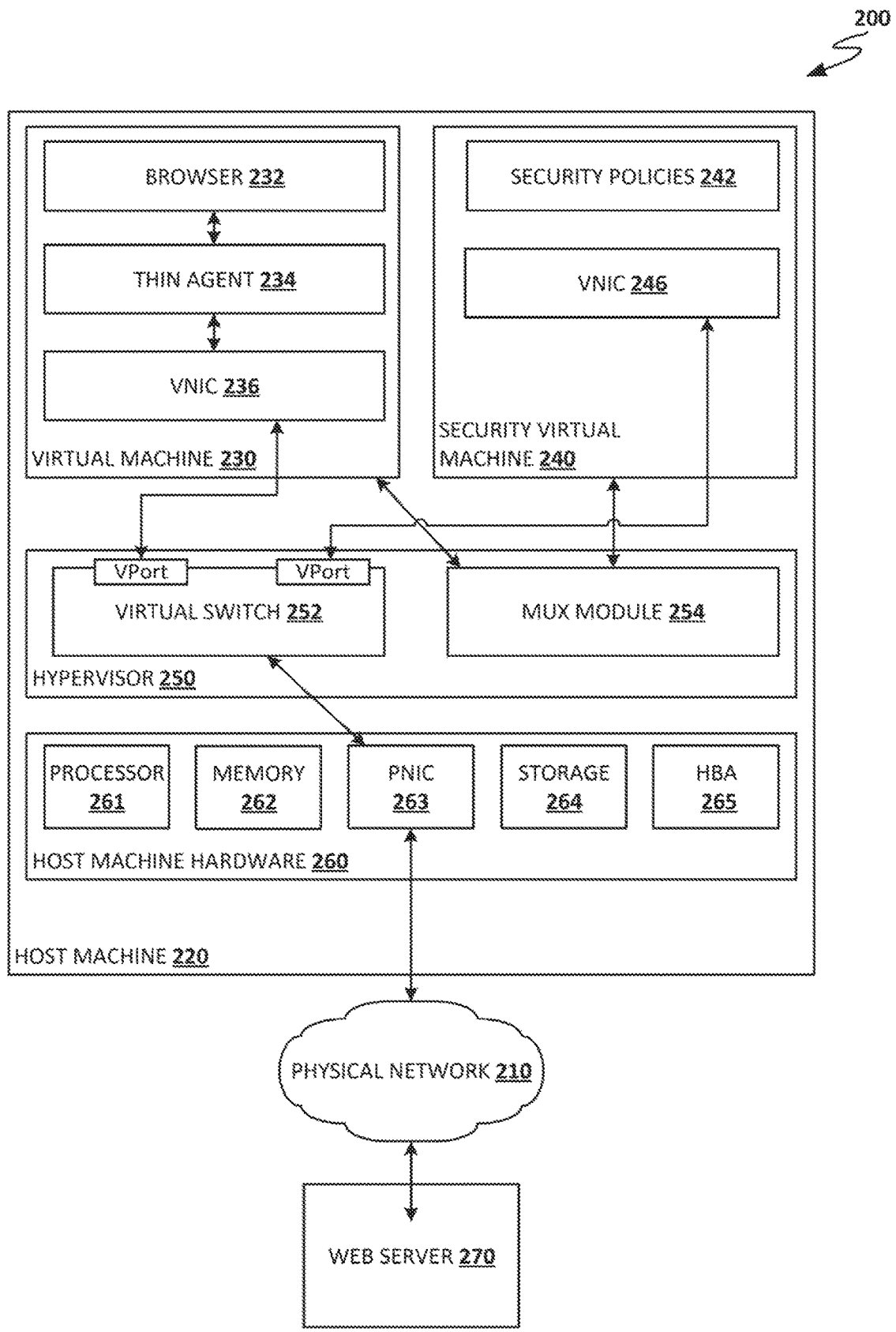
FIG. 2 is a block diagram of a network.

FIG. 2 is a block diagram of a computing network 200. In this example, computing network 200 includes host machine 220 and web server 270, in communication over physical network 210. In this example, host machine 220 includes virtual machines that are part of a VDI system. For example, host machine 220 may correspond to host machine 150 of FIG. 1, and virtual machine (VM) 230 may correspond to VM 165 of FIG. 1. In certain embodiments, virtual machines and host machines in the VDI system access web server 270 via a gateway (not shown) that may be implemented in a physical machine or a virtual machine in the VDI system. In other embodiments, computing network 200 may include a plurality of other host machines, and each host machine may in turn host a plurality of VMs.

Host machine 220 may be configured to provide Endpoint Security (EPSec) which enables guest introspection (e.g., file, network, system, etc. introspection) of VMs in a centralized manner from outside the VM. Introspection refers to monitoring of different aspects, activities, files, commands, etc. that occur during the running of a VM. For example, file introspection (e.g., file scanning, such as for viruses) for VMs running on host machine 220 is performed by a dedicated security virtual machine (SVM) also running on host machine 220 as further discussed herein.

Host machine 220 includes virtual machine (VM) 230, security virtual machine (SVM) 240, hypervisor 250 and host machine hardware 260. VM 230 is a virtualized computing instance executing on host machine 220, managed by hypervisor 250. Though certain embodiments are described herein with respect to VMs, the same principals and techniques may also apply to other appropriate virtual computing instances (e.g., virtual machine, container, data compute node, isolated user space instance). VM 230 includes browser 232, thin agent 234 and virtual network interface card (VNIC) 236. VNIC 236 is responsible for exchanging network packets between VM 220 and hypervisor 250. Thin agent 234 is an in-guest agent of an external security system. In particular, thin agent 234 is an agent of SVM 240. Thin agent 234 can collect information about VM 230.

In particular, thin agent 234 is configured to intercept network events (e.g., network connection events), file events (e.g., file access events), system events, etc. that are generated due to calls made by applications, such as browser 232, running in VM 230 and deliver information (e.g., a type of the event, network addresses associated with the event, file names associated with the event, file locations associated with the event, etc.) about such events to the SVM 240 as further discussed herein. For example, an operating system running on VM 230 provides libraries that deliver such information about such events generated based on calls made by applications running on the operating system to a registered client. Accordingly, thin agent 234 is registered with the operating system and receives such events occurring on VM 230 from the operating system. The libraries are further configured to cause the operating system to wait for a response from the registered client of whether or not to allow the event to occur. Accordingly, thin agent 234 indicates to the operating system whether or not to allow the event to occur, and the operating system either allows or denies the event for the application that made the call. Thin agent 234 is configured to communicate with SVM 240 in order to make an enforcement decision as to whether or not to allow the event to occur, as further discussed herein, and then indicate the enforcement decision to the operating system.

SVM 240 is used as an enforcement entity for security policies 242. SVM 240 may be configured by a central controller of the logical network or may be maintained by a third party security provider. SVM 240 is responsible for the security of virtual entities within a logical network. For example, SVM 240 receives information about events occurring on VM 230 from thin agent 234. SVM 240 then determines an enforcement decision (i.e., whether or not to allow the event) for each event based on security policies 242. Security policies 242 include one or more rules (e.g., firewall rules, file access rules, etc.) that indicate which events are allowed or not. SVM 240, as discussed, communicates the enforcement decision back to thin agent 234 running on VM 230, which indicates the enforcement decision to the operating system of VM 230 for enforcement as discussed. VNIC 246 is responsible for exchanging network packets between VM 220 and hypervisor 250.

In this example, VM 230 and SVM 240 are hosted by the same host machine. As a result, information and enforcement decisions are sent via hypervisor 250 resident on the host machine between VM 230 and SVM 240. In other embodiments, VM 230 and SVM 240 are hosted on different host machines. In such embodiments hypervisor 250 transmits information to SVM 240 over physical network 210 (e.g., using TEPs as discussed) and SVM 240 returns enforcement decisions to hypervisor 250 over physical network 210 (e.g., using TEPs as discussed).

Hypervisor 250 serves as an interface between VMs running on host machine 220, such as via a virtual switch 252. Hypervisor 250 also serves as an interface for VMs running on other host machines, such as via physical network interface card (PNIC) 263. Accordingly, VNIC 236 enables network connections to be made by VM 230, both to other VMs in a logical network and computing devices across a physical network. VNIC 236 is a virtualized network card that is a software implementation of a PNIC. Though shown as included in VM 220, it should be understood that VNIC 236 may be implemented by code (e.g., VM monitor code) associated with hypervisor 250.

Hypervisor 250 includes virtual switch 252, which is connected to VNICs 236 and 246 via virtual ports (VPorts). In this example, hypervisor 250 is an interface for VM 230 and SVM 240, but in other embodiments host machine 220 may host a plurality of other VMs, which may all be connected to, and controlled by, hypervisor 250. In such examples, hypervisor 250, via virtual switch 252, can direct network communications between the plurality of VMs and other entities. A virtual switch serves as a physical network switch, e.g., an edge device on the physical network, but implemented in software. Virtual switch 252 is also connected to PNIC 263 to allow network traffic to be exchanged between VMs executing on a given host machine and destinations on an external physical network.

In some embodiments, VM 230 and SVM 240 exchange information as network packets via virtual switch 252, as discussed. In other embodiments, VM 230 and SVM 240 exchange information relating to events and enforcement decisions as discussed via a mux module 254 running in hypervisor 250 that is separate from virtual switch 252. Accordingly, event and enforcement decision information is separated from network traffic that is passed through virtual switch 252. For example, the VM 230 communicates with the mux module 254 using a virtual machine communication interface (VMCI) channel such as described in U.S. Pat. No. 8,521,996, which is hereby expressly incorporated by reference in its entirety. The mux module 254 further forms a local TCP/IP session with SVM 240 and exchanges data with SVM 240 over the local TCP/IP session.

Hypervisor 250, in some embodiments, runs in conjunction with a conventional operating system in host machine 220. In some other embodiments, hypervisor 250 is installed directly on respective host machine 220 and inserts a virtualization layer between host machine hardware 260 and VM 230. In yet some other embodiments (also not shown) hypervisor 250 includes system level software component and a privileged virtual machine that contains physical device drivers (not shown), virtual switches, or other hypervisor components.

Host machine hardware 260 includes the basic hardware components of host machine 220, which allow for the execution of VMs. Host machine hardware 260 includes one or more processors 261, memory 262, PNIC 263, storage 264, a host bus adapter (HBA) 265, and other I/O devices such as, for example, a mouse and keyboard (not shown). Processor 261 is configured to execute instructions, for example, executable instructions that perform one or more operations described herein and may be stored in memory 262 and in storage 264. Memory 262 is a device allowing information, such as executable instructions, cryptographic keys, virtual disks, configurations, and other data, to be stored and retrieved. Memory 262 is where programs and data are kept when the processor is actively using them. Memory 262 may be a byte-addressable, random access memory, and memory 262 may include, for example, one or more random access memory (RAM) modules. PNIC 263 enables host machine 220 to communicate with another device (e.g., other hardware computing platforms, entities, or host machines) via a communication medium. Storage 264 represents one or more persistent storage devices (e.g., one or more hard disks, flash memory modules, solid state disks, and optical disks) in host machine 220.

As discussed, thin agent 234 receives notification of an event generated on VM 230 based on a call made by an application running on VM 230 and exchanges notification of the generated event with SVM 240. SVM 240, based on security policies 242, generates an enforcement decision for the event and exchanges the enforcement decision with thin agent 234 running on VM 230. Thin agent 234 then notifies the operating system running on VM 230 of the enforcement decision.

In addition to thin agent 234 and SVM 240 exchanging notification of an event generation and making enforcement decisions thereon, thin agent 234 is configured to identify user and process information associated with an event, as discussed later herein. User information refers to information about a user (e.g., user ID) accessing the application that made the call that generated the event. Process information refers to information about the application (e.g., process ID that identifies the application) that made the call that generated the event. Thin agent 234, in addition to the notification of the event, exchanges the user and process information associated with the event with SVM 240. Security policies 242 further include rules that allow or deny certain events based on the user and process information associated with the event. Accordingly, security policies 242 can be more finely created. SVM 240, based on security policies 242, generates an enforcement decision for the event based on the user and process information associated with the event and exchanges the enforcement decision with thin agent 234 running on VM 230. Thin agent 234 then notifies the operating system running on VM 230 of the enforcement decision.

In one example, browser 232 attempts to make contact with web server 270. Web server 270 is a remote server accessible using browser 232. Web server 270 is accessible over physical network 210. In a VDI system, a remote client computer (not shown) may be controlling the web browsing activity of browser 232. In this example, security policies 242 include rules defining file access and network access allowed by VMs, and in particular include a rule that uploading and downloading of files for connections to web servers by VM 230 are prohibited.

Initially, a socket connection between browser 232 and web server 270 is opened via the operating system running on VM 230. The thin agent 234, being registered with the operating system as discussed, receives notification of certain socket connection inbound/outbound events (e.g., depending on IP table rules that indicate which socket connection inbound/outbound events to notify thin agent 234), such as for socket connections between VM 230 and network destinations of interest (e.g., web servers) for which security policies 242 are to be applied by SVM 240, such as those outside the local area network of VM 230. For example, the operating system sends the socket connection inbound/outbound events as network packets to thin agent 234. The network packets include headers (e.g., TCP and IP headers), including network information (e.g., address and port information) associated with VM 230 and web server 270. However, the network packets do not include user information or process information associated with the browser 232.

Thin agent 234, being in VM 230, can access a file system of VM 230. Accordingly, thin agent 234 then accesses the file system of VM 230 and matches the socket connection event to a user of VM 230 and a process of VM 230, which in this case is browser 232. In particular, in some embodiments, the operating system of VM 230 is configured to maintain and store in the file system of VM 230 (e.g., in the folder /proc/net/tcp in a Linux based system) a list of currently active socket connections (e.g., TCP connections). The list maps network information associated with a socket connection (e.g., source and destination port information) to data (e.g., a data structure such as an inode). The data structure includes user information associated with browser 232 that opened the socket connection with web server 270. Accordingly, thin agent 234 determines user information associated with the socket connection inbound/outbound event based on mapping the network information of network packets of the socket connection to data structure including the user information using the list.

The data structure further includes a number (e.g., inode number). The operating system is further configured to maintain (e.g., in a folder/proc in a Linux based system) a list of process IDs (e.g., as folders named with the process IDs) each associated with a file descriptor (e.g., as a directory in the process ID folder). Each file descriptor contains a list of socket connections opened by the application associated with the process ID associated with the file descriptor. In particular, the list includes entries including the number of the data structure associated with the socket connection. Accordingly, thin agent 234 determines process information associated with the socket connection inbound/outbound event based on mapping the network information of network packets of the socket connection to the data structure including the number. The thin agent 234 further searches the file descriptors associated with the list of process IDs for the number. The thin agent 234, upon finding the file descriptor with the number, maps the file descriptor to the process information.

Thin agent 234 then stores open socket information (e.g., in a cache, other data structure, etc.) that includes the process information and/or user information associated with the open socket connections for network destinations of interest. In some embodiments, the process information and/or user information is further stored associated with the corresponding network information associated with the socket.

Then, if browser 232 attempts to access a file of VM 230, thin agent 234, being registered with the operating system running on VM 230, receives notification of the file access event from the operating system. The operating system is configured to provide process information and/or user information associated with the file access event in the notification. For example, the operating system includes a process ID of browser 232 that attempted the file access, and a user ID of the user operating browser 232. In some embodiments, the operating system is further configured to provide in the notification a type of the file access event (e.g., a write, read, etc.), a location in a file system that the file access event is directed to, information about the file, etc.

Thin agent 234, based on the process information and/or user information associated with the file access event, determines if the file access event is associated with a network destination of interest, such as web server 270. In particular, thin agent 234 checks the stored open socket information for any entries with the process information and/or user information of the file access event. If there is no entry, thin agent 234 just sends the file access event information to SVM 240 for it to make an enforcement decision. If there is an entry, thin agent 230 sends the file access event information along with context information (e.g., network information) of the associated socket connection to SVM 240.

SVM 240 evaluates the received file access event information and context information and generates an enforcement decision based thereon. In one example, the SVM 240, based on the file access information, determines that the file access event is to a restricted folder in the file system of VM 230 that web servers are not allowed to access based on security policies 242. The SVM 240, based on the context information, further determines that the socket connection is with a web server 270 and therefore the file access event is associated with web server 270. The SVM 240, based on the file access event being associated with web server 270 and to a restricted folder generates an enforcement decision to deny the file access event based on security policies 242. As discussed, SVM 240 sends the enforcement decision to thin agent 234 for enforcement.

In another example, the SVM 240, based on the file access information, determines that the file access event is to an allowed folder (e.g., cache folder) in the file system of VM 230 that web servers are allowed to access based on security policies 242. The SVM 240, based on the context information, further determines that the socket connection is with a web server 270 and therefore the file access event is associated with web server 270. The SVM 240, based on the file access event being associated with web server 270 and to an allowed folder generates an enforcement decision to allow the file access event based on security policies 242. As discussed, SVM 240 sends the enforcement decision to thin agent 234 for enforcement.

Based on this example, it is evident that more granular enforcement mechanisms can be achieved using the embodiments described herein. For example, browser 232 can be blocked from uploading and/or downloading files from web servers by enforcing policies that restrict access to certain folders of the file system of VM 230 by web servers. Further, browser 232 can still cache temporary files, needed by browser 232 to operate, in folders that are allowed to be accesses by web servers. Advantageously, the embodiments described herein thus improve the security of VMs and computing devices, while still allowing applications to execute properly on the VMs and computing devices.

Figure 3:
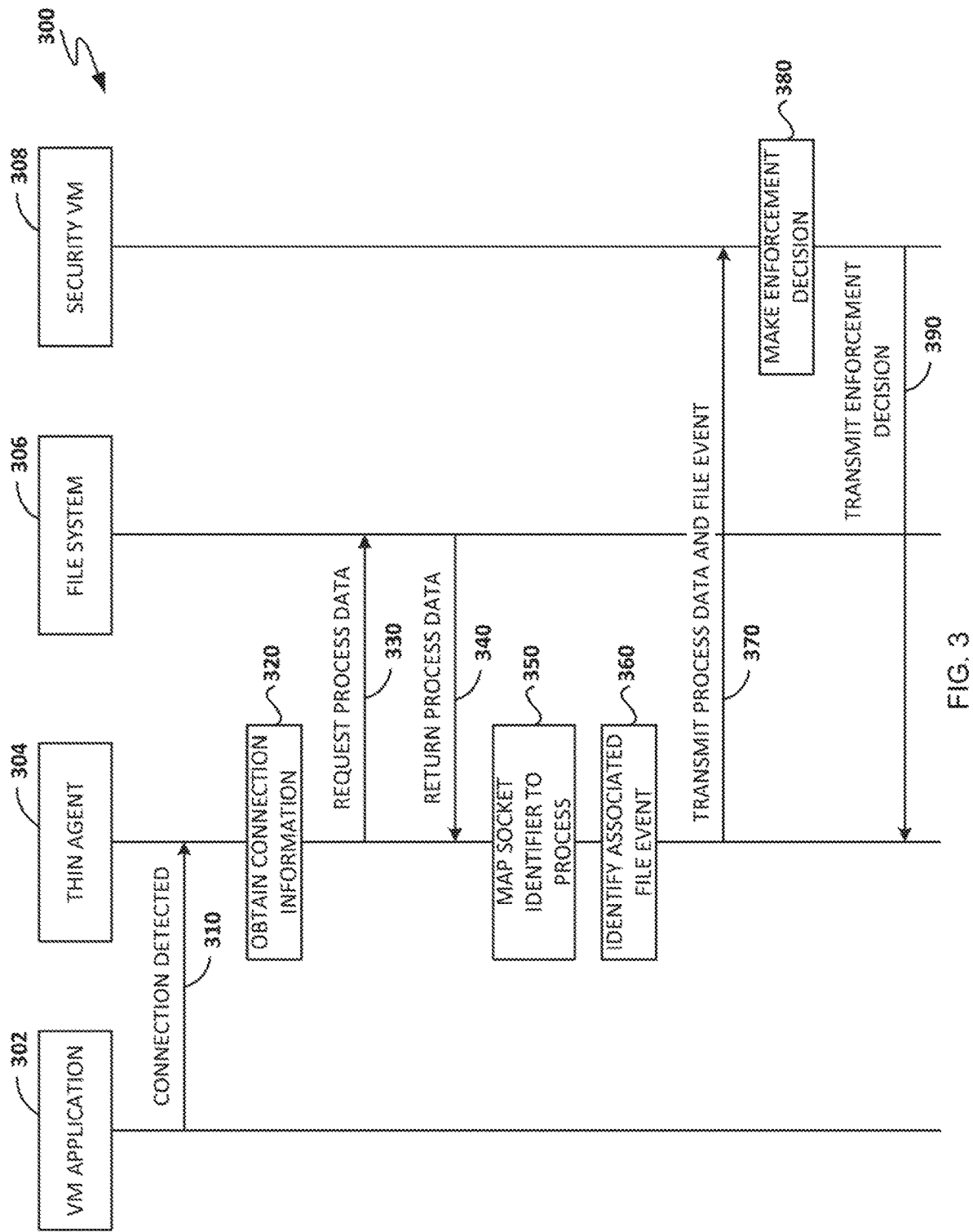
FIG. 3 is a call-flow diagram of example operations for restricting actions associated with network connections in virtual machines.

FIG. 3 is a call-flow diagram of example operations 300 for restricting actions associated with network connections in virtual machines. Operations 300 involve communications from four entities, VM application 302 (e.g., a browser), thin agent 304, file system 306 and SVM 308. VM application 302, thin agent 304 and file system 306 are processes executing on and files stored on a VM, while SVM 308 is located remote relative to this VM. VM application 302 is a process attempting to establish a network connection to a remote entity, thin agent 304 is an in-VM agent installed on the VM to perform introspection, such as guest introspection, and file system 306 includes information relating to processes of the VM and users of the VM.

Operations 300 begin at transmission 310, where thin agent 304 detects an attempted connection between VM application 302 and an external entity. In some embodiments, thin agent 304 detects an attempted connection based on a notification from the OS of the VM as discussed. In some embodiments, the notification includes network packets transmitted from or to the VM.

Operations 300 continue at block 320, where thin agent 304 obtains network information associated with the attempted connection. For example, if the network packet inspected at transmission 310 is a TCP packet, thin agent 304 extracts a source port of an outgoing packet and a destination port of the TCP packet. Thin agent 304 uses the extracted port information to determine a user of the VM associated with the network packet, as well as a socket identifier (e.g., inode number) associated with the network packet, as described in further detail below with respect to FIG. 4. For example, as discussed, thin agent 304 identifies, using a list of active socket connections to or from the VM, a user ID and a socket identifier associated with the network packet.

Operations 300 continue at transmission 330, where thin agent 304 requests from file system 306 process data for processes currently running on the VM. At transmission 340, file system 306 returns the requested process data to thin agent 304.

Operations 300 continue at block 350, where thin agent 304 maps the socket identifier determined at block 320 to a specific process associated with the process data returned at transmission 340. For example, as discussed, thin agent 304 iterates through all returned process data in order to locate a process associated with the socket identifier. When thin agent 304 so identifies a process, thin agent 304 has identified both the user and the process associated with the attempted connection. This information can be used to make a security decision with respect to file access events initiated by the attempted connection, as discussed. For example, thin agent 304 stores the identified user information and process information mapped to associated context information (e.g., network information), as discussed.

Operations 300 continue at block 360, where thin agent 304 identifies a file access event associated with the process and/or user. A file access event may be a read event (e.g., an attempted upload of a file on the VM to a network destination) or a write event (e.g., an attempted download of a file to the VM from a network source). Some security policies may prohibit all downloading or uploading of files, while other security policies may allow or prohibit the transmission of certain files on a file-by-file basis. Using this file access event and the information mapped at block 350, it is possible for SVM 308 to generate a complete security decision of any level of granularity.

Operations 300 continue at transmission 370, where thin agent 304 transmits the context information associated with the mapped process data as well as information about the file access event to SVM 308. SVM 308 uses the context information and file access event information, at block 380, to make an enforcement decision with respect to the file access event related to the attempted connection. The enforcement decision is based on security policies stored by SVM 308 rather than on the VM, in order to prevent user modification of the security policies.

Operations 300 conclude at transmission 390, where SVM 308 transmits the enforcement decision to thin agent 304. After receiving the enforcement decision (e.g., allowing or denying the file access event), thin agent 304, in conjunction with the OS, implements the enforcement decision either by allowing or preventing the file access event associated with the attempted connection.

Figure 4:
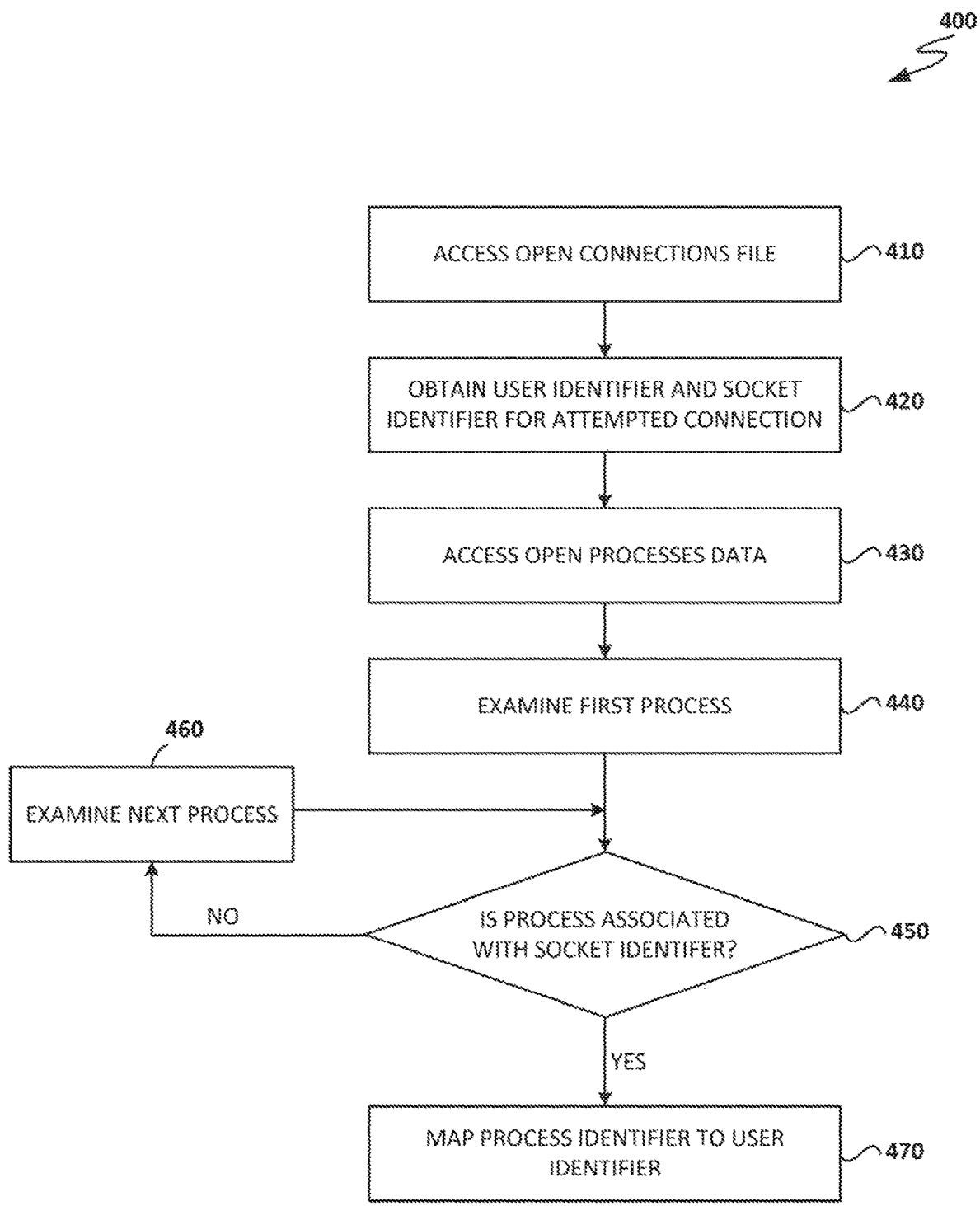
FIG. 4 illustrates example operations for mapping user and process information.

FIG. 4 illustrates example operations 400 for mapping user and process information within a VM. Operations 400 are performed by a thin agent as described herein, and take place after the thin agent has detected an attempted connection. Operations 400 begin at block 410 where an open connections file (e.g., a list of currently active socket connections) is accessed. In some embodiments, an open connections file includes information associating a socket with a user. A socket represents a single connection between two entities and is defined by a source port, a source address, a destination port and a destination address. In some embodiments, access to the open connections file is available to any user of the VM, that is, in user space of the VM. For example, administrator-level access is not needed to access the open connections file.

At block 420, the thin agent obtains a user identifier and an associated socket identifier (e.g., inode number) from the open connections file. Both the user identifier and the socket identifier are associated with the attempted connection. For example, in Unix or Unix-like operating systems, an open connections file contains a listing of all open connections. Each entry on the listing specifies a user identification number (UID) and a socket identifier (e.g., inode number).

At block 430, the thin agent accesses open processes data (e.g., a list of process IDs) associated with open processes on the VM. For example, open processes data is maintained as a file folder system, wherein different folders are named based on process IDs. Each folder includes a file with a list of identifiers associated with the process ID associated with the folder name.

At block 440, the thin agent examines the open processes data associated with a first process. For example, the thin agent examines to list of socket identifiers associated with the first process. Operations 400 proceed from block 440 to block 450, where the thin agent determines if the process under examination is associated with the socket identifier obtained at block 420. In the example of Unix and Unix-like operating systems above, the thin agent determines if the list of identifiers file in the folder associated with the process includes the inode number obtained at block 420, as discussed.

If the process being examined is not associated with the socket identifier, operations 400 proceed to block 460, where the next process is examined. If the process being examined is associated with the socket identifier, operations 400 proceed to block 470. Effectively, the thin agent iterates through the open processes file until a match is found between a process and the socket identifier.

At block 470, the thin agent maps the process identifier determined at block 450 with the user identifier determined at block 420. Mapping these identifiers may include adding both identifiers, as well as information (e.g., network information) associated with the identifiers, to a single file. If a file access event associated with the process identifier and user identifier is detected by the thin agent, the thin agent accesses the single file to determine if the process identifier and user identifier are included in the single file, thereby determining that the file access event is associated with a previous connection attempt. The thin agent transmits information about the file access event as well as context information (e.g., network information) indicating the file access event is associated with a previous connection attempt to a SVM, for full evaluation and generation of an enforcement decision as discussed.

Figure 5:
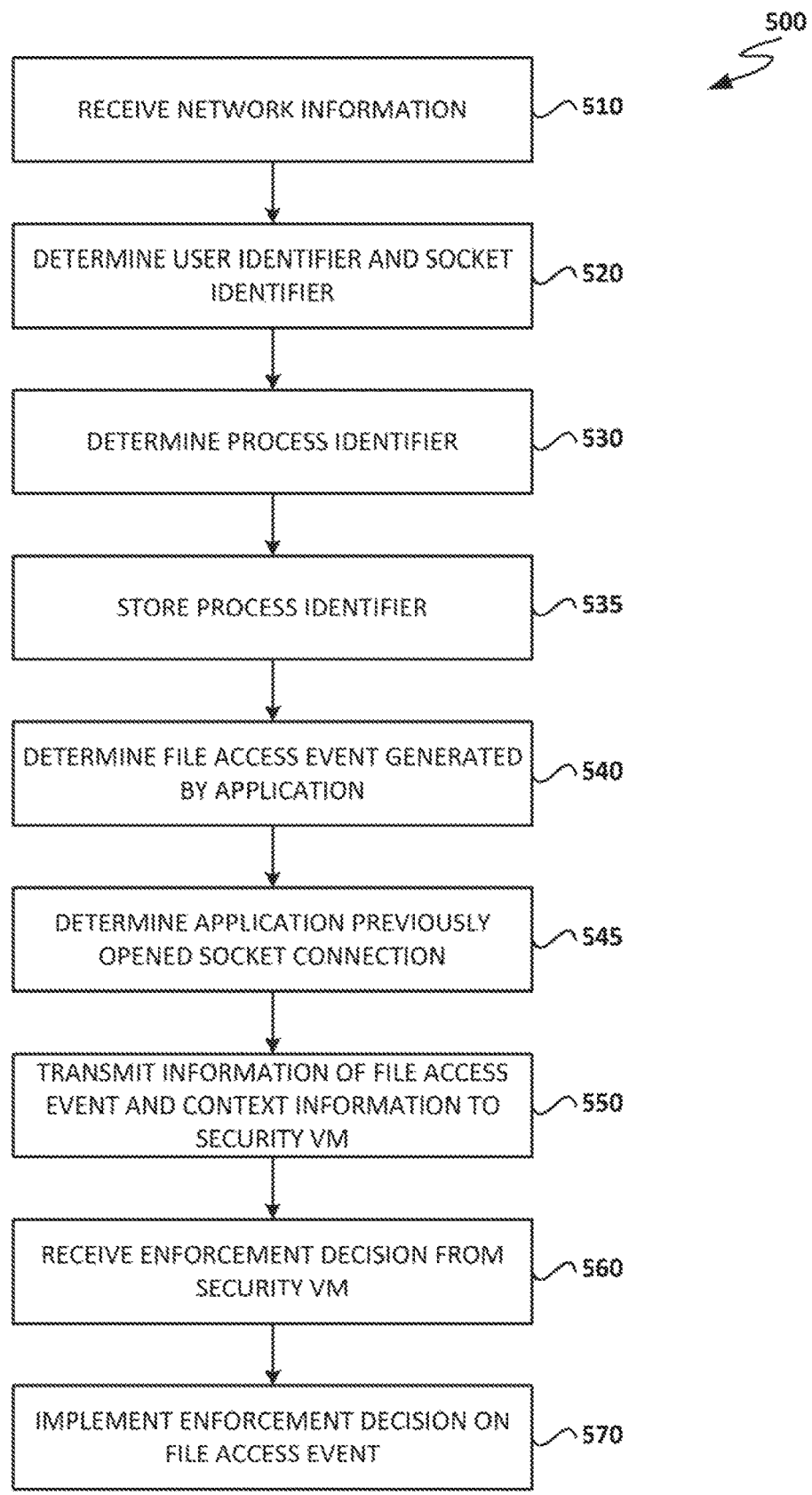
FIG. 5 illustrates example operations for restricting actions associated with network connections in virtual machines using in-VM agents.

FIG. 5 illustrates example operations 500 for restricting actions associated with network connections in virtual machines using in-VM agents. Operations 500 may be performed by a thin agent, such as thin agent 234 of FIG. 2. Operations 500 begin at block 510, where network information relating to a socket connection opened by an application running on a VM is received by the thin agent running on the VM. Network information may be received as network packets associated with the connection from an OS of the VM as discussed.

At block 520, the thin agent determines a user identifier and a socket identifier associated with the socket connection and application that opened the socket connection. The thin agent determines the user identifier and the socket identifier using source port and destination port information contained in headers of the network packets obtained by the thin agent at block 510 and a list of current active socket connections stored in a file system of the VM as discussed.

At block 530, to the thin agent determines a process identifier associated with the application that opened the socket connection. For example, the thin agent determines the process identifier by matching the socket identifier to a process in the open processes data stored in the file system, as discussed.

At block 535, the thin agent stores (e.g., in a single file) the process identifier (e.g., and the user identifier mapped to the process identifier). As discussed, the process identifiers (e.g., with associated user identifiers) in the single file indicate that the applications associated with the process identifiers have previously opened a socket connection. In some aspects, additional context information (e.g., network information associated with the socket connection) is stored in the single file mapped to the process identifier.

At block 540, the thin agent determines the application has generated an attempted file access event. A file access event is an attempt to open, modify or create a file on the VM. For example, the OS notifies the thin agent of the file access event, as discussed.

At block 545, the thin agent determines the application that generated the attempted file access event previously opened a socket connection. For example, the thin agent maps a process identifier (e.g., and user identifier) included in the file access event information received from the OS to the stored process identifier as discussed.

At block 550, the thin agent transmits information about the file access event and context information about the application that generated the attempted file access event to a security VM. For example, the information about the file access event includes a file location and file access type (e.g., read, write, etc.) received from the OS. Further, the context information includes an indication that the application previously opened a socket connection and/or network information about the socket connection.

Using the context information and information about the file access event, the security VM determines if the attempted file access event should be allowed, as discussed, and generates an enforcement decision accordingly.

At block 560, the thin agent receives an enforcement decision from the security VM.

At block 570, the thin agent implements the enforcement decision on the file access event. Implementation of an enforcement decision may include allowing the file access event or preventing the file access event. Implementation may further include alerting the user of the VM of either the failure or success of the attempted file access event. If the attempted file access event is prevented, further steps may be taken to prevent file access events from being attempted by the process in the future.

The embodiments described herein may provide several advantages over other systems and methods for restricting network access to virtual machines. For example, another method of restricting network access is server-based. In a server-based method, all network information collected outside of the virtual machine, and security decisions are based on that network information. This method presents problems, as the network information collected may be of less value, and less complete, than information collected within the virtual machine. Ultimately, a security decision based on this incomplete information will likely be either broader than necessary, thus needlessly disrupting use of the virtual machine, or less comprehensive than necessary, thus exposing the virtual machine to potentially malicious connections. Most administrators would opt for the over-broad approach, but this merely results in system-wide inefficiency and difficulty of use. Still another method is agent-based. In an agent-based method, an agent within the virtual machine collects information and also generates and enforces security decisions. While this method allows for the collection of superior network information, enforcement within the virtual machine is a security risk, as the agent be compromised by users of the virtual machine.

By utilizing the systems and methods discussed herein, network information may be collected within the virtual machine, but sent outside the virtual to a secure location for evaluation and generation of enforcement decisions. In so doing, the current disclosure benefits from the superior information collection of the agent-based approach without the security risks of containing all security activity within the virtual machine. Similarly, the current disclosure benefits from the more secure decision-making of the server-based approach without the deficient information collection. Further, the current approach utilizes data available within the user space of a virtual machine, and thus may be utilized on many different kinds of virtual machines without significant retooling of the methods.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for preventing access to files by a virtual machine executing on a host machine, comprising:
receiving, at the virtual machine, network information associated with a network connection opened by a process at the virtual machine, wherein the network connection is used for connecting the virtual machine to another machine outside the host machine and for accessing one or more files;
identifying the process that opened the network connection;
determining that the process that opened the network connection initiated a file access event to access the one or more files;
transmitting, from the virtual machine, information indicative of the file access event and the network connection to a security virtual machine;
receiving an enforcement decision for the file access event from the security virtual machine, wherein the enforcement decision is generated based on the information indicative of the file access event and the network connection; and
applying the enforcement decision to either allow or prevent the access to the one or more files by the process executing on the virtual machine.

2. The method of claim 1, wherein determining the process that opened the network connection comprises:
determining a socket identifier associated with the network connection based on the network information and a stored mapping of network information to socket identifiers accessible by the virtual machine; and
mapping the socket identifier to a process identifier of the process based on a stored mapping of socket identifiers to process identifiers accessible by the virtual machine.

3. The method of claim 2, wherein the network information comprises a source port and a destination port extracted from a header of a network packet sent over the network connection, and wherein the stored mapping of network information to socket identifiers comprises a list of open socket connections and their corresponding source and destination ports at the virtual machine.

4. The method of claim 2, wherein the stored mapping of socket identifiers to process identifiers comprises a set of folders having folder names corresponding to the process identifiers, each folder of the set of folders including a file comprising one or more socket identifiers.

5. The method of claim 1, further comprising registering with an operating system on the virtual machine to receive event information, wherein the network information and the information indicative of the file access event are part of the event information received from the operating system.

6. The method of claim 1, wherein the information indicative of the file access event and the network connection comprises a file location associated with the file access event, and further comprising:
allowing the file access event when the file location comprises a first folder; and
preventing the file access event when the file location comprises a second folder.

7. The method of claim 6, wherein the first folder is designated for storing temporary files of the process, and wherein the second folder is not designated for storing the temporary files of the process.

8. The method of claim 6, wherein the security virtual machine is configured to generate the enforcement decision based on a security policy indicating that processes with an open network connection cannot access certain file locations.

9. The method of claim 1, further comprising determining a user identifier associated with a user operating the process, wherein the enforcement decision is further generated based on the user identifier.

10. A computer system comprising:
a memory; and at least one processor coupled to the memory, the at least one processor configured to execute a method for preventing access to files by a virtual machine executing on a host machine, the method comprising:

receiving, at the virtual machine, network information associated with a network connection opened by a process at the virtual machine, wherein the network connection is used for connecting the virtual machine to another machine outside the host machine and for accessing one or more files;

identifying the process that opened the network connection;

determining that the process that opened the network connection initiated a file access event to access the one or more files;

transmitting, from the virtual machine, information indicative of the file access event and the network connection to a security virtual machine;

receiving an enforcement decision for the file access event from the security virtual machine, wherein the enforcement decision is generated based on the information indicative of the file access event and the network connection; and applying the enforcement decision to either allow or prevent the access to the one or more files by the process executing on the virtual machine.

11. The computer system of claim 10, wherein determining the process that opened the network connection comprises:

determining a socket identifier associated with the network connection based on the network information and a stored mapping of network information to socket identifiers accessible by the virtual machine; and mapping the socket identifier to a process identifier of the process based on a stored mapping of socket identifiers to process identifiers accessible by the virtual machine.

12. The computer system of claim 11, wherein the network information comprises a source port and a destination port extracted from a header of a network packet sent over the network connection, and wherein the stored mapping of network information to socket identifiers comprises a list of open socket connections and their corresponding source and destination ports at the virtual machine.

13. The computer system of claim 11, wherein the stored mapping of socket identifiers to process identifiers comprises a set of folders having folder names corresponding to the process identifiers, each folder of the set of folders including a file comprising one or more socket identifiers.

14. The computer system of claim 10, the method further comprising registering with an operating system on the virtual machine to receive event information, wherein the network information and the information indicative of the file access event are part of the event information received from the operating system.

15. The computer system of claim 10, wherein the information indicative of the file access event and the network connection comprises a file location associated with the file access event, and the method further comprising:

allowing the file access event when the file location comprises a first folder; and preventing the file access event when the file location comprises a second folder.

16. The computer system of claim 15, wherein the first folder is designated for storing temporary files of the process, and wherein the second folder is not designated for storing the temporary files of the process.

17. The computer system of claim 15, wherein the security virtual machine is configured to generate the enforcement decision based on a security policy indicating that processes with an open network connection cannot access certain file locations.

18. The computer system of claim 10, the method further comprising determining a user identifier associated with a user operating the process, wherein the enforcement decision is further generated based on the user identifier.

19. A non-transitory computer readable medium comprising instructions to be executed in a computer system, wherein the instructions when executed in the computer system perform a method for preventing access to files by a virtual machine executing on a host machine, the method comprising:

receiving, at the virtual machine, network information associated with a network connection opened by a process at the virtual machine, wherein the network connection is used for connecting the virtual machine to another machine outside the host machine and for accessing one or more files;

identifying the process that opened the network connection;

determining that the process that opened the network connection initiated a file access event to access the one or more files;

transmitting, from the virtual machine, information indicative of the file access event and the network connection to a security virtual machine;

receiving an enforcement decision for the file access event from the security virtual machine, wherein the enforcement decision is generated based on the information indicative of the file access event and the network connection; and applying the enforcement decision to either allow or prevent the access to the one or more files by the process executing on the virtual machine.

20. The non-transitory computer readable medium of claim 19, wherein determining the process that opened the network connection comprises:

determining a socket identifier associated with the network connection based on the network information and a stored mapping of network information to socket identifiers accessible by the virtual machine; and mapping the socket identifier to a process identifier of the process based on a stored mapping of socket identifiers to process identifiers accessible by the virtual machine.

21. The method of claim 1, wherein the host machine is located within a datacenter, wherein the process executing on the virtual machine is initiated by a remote client machine outside the datacenter using a virtualized desktop infrastructure (VDI) client program to connect to the other machine outside the host machine.

22. The method of claim 1, wherein the steps of receiving the network information, identifying the process, determining the process that opened the network connection initiated the file access event, transmitting the information, receiving the enforcement decision, and applying the enforcement decision are performed by a thin agent within the virtual machine, wherein the thin agent is registered with an operating system of the virtual machine to:

receive the file access event from the operating system of the virtual machine when a remote user initiates the process on the virtual machine; and allow the remote user to partially access a file system of the virtual machine based on the enforcement decision received from the security virtual machine.

* * * * *